Patented Jan. 22, 1929.

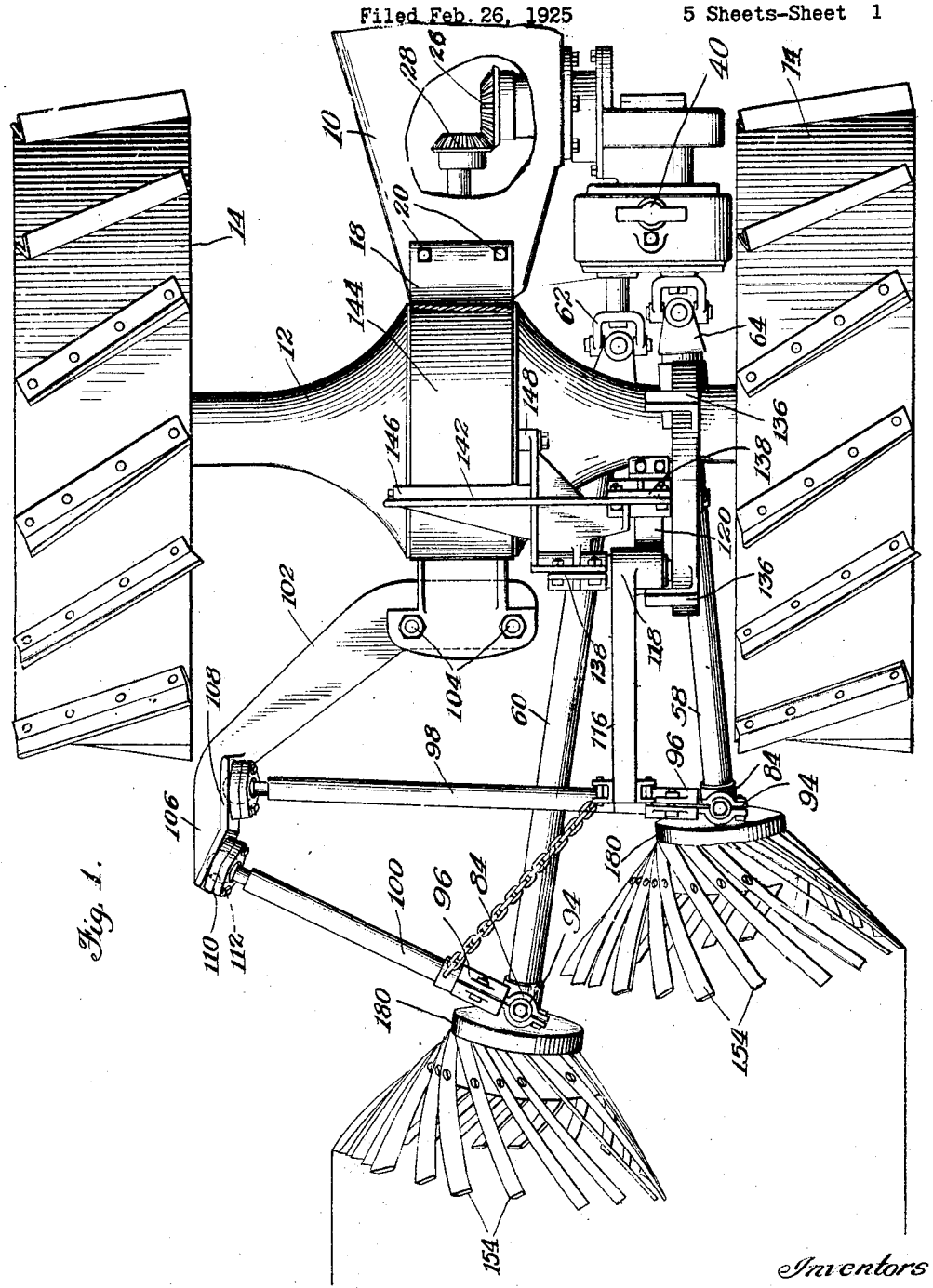

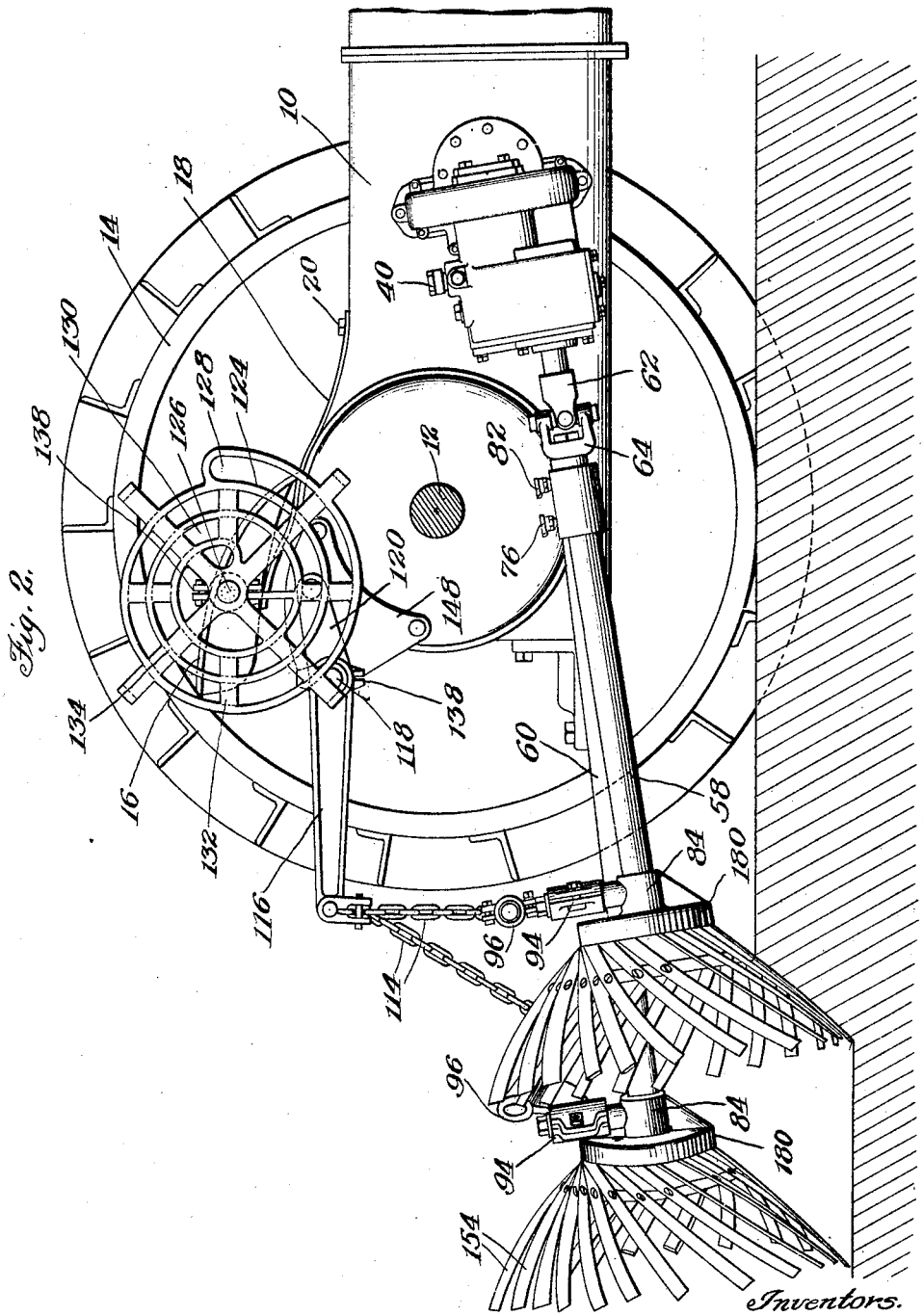

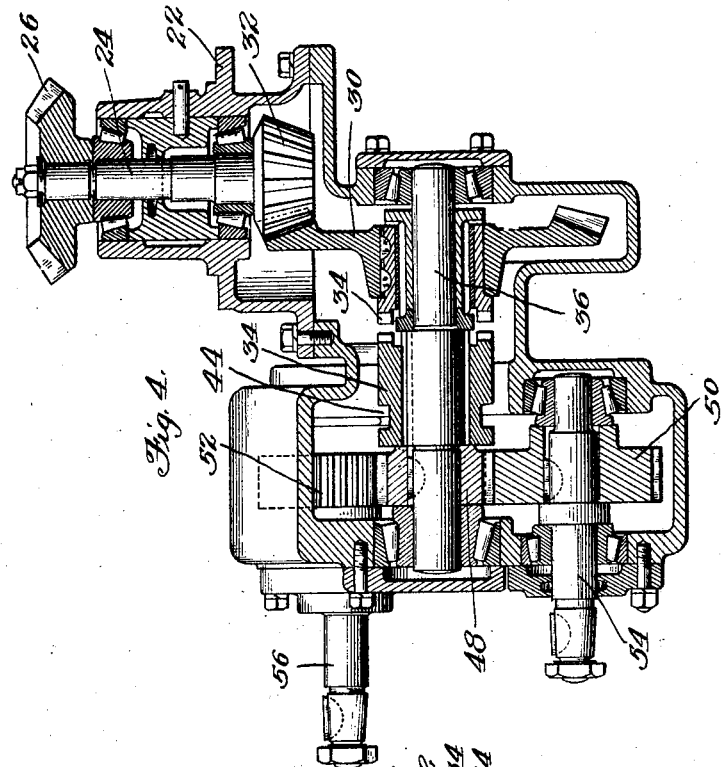
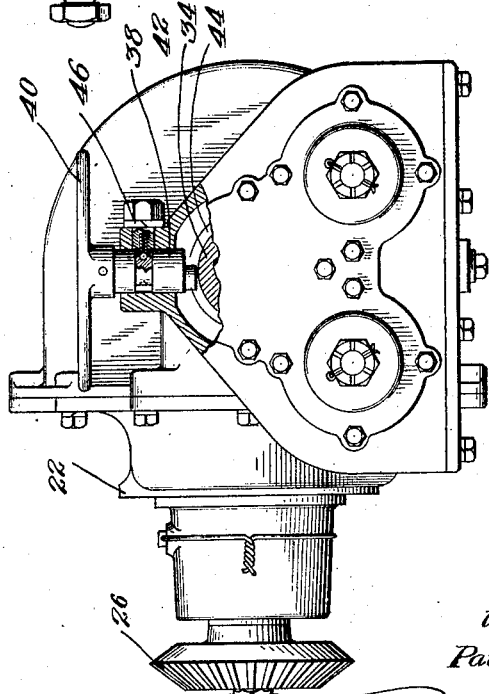

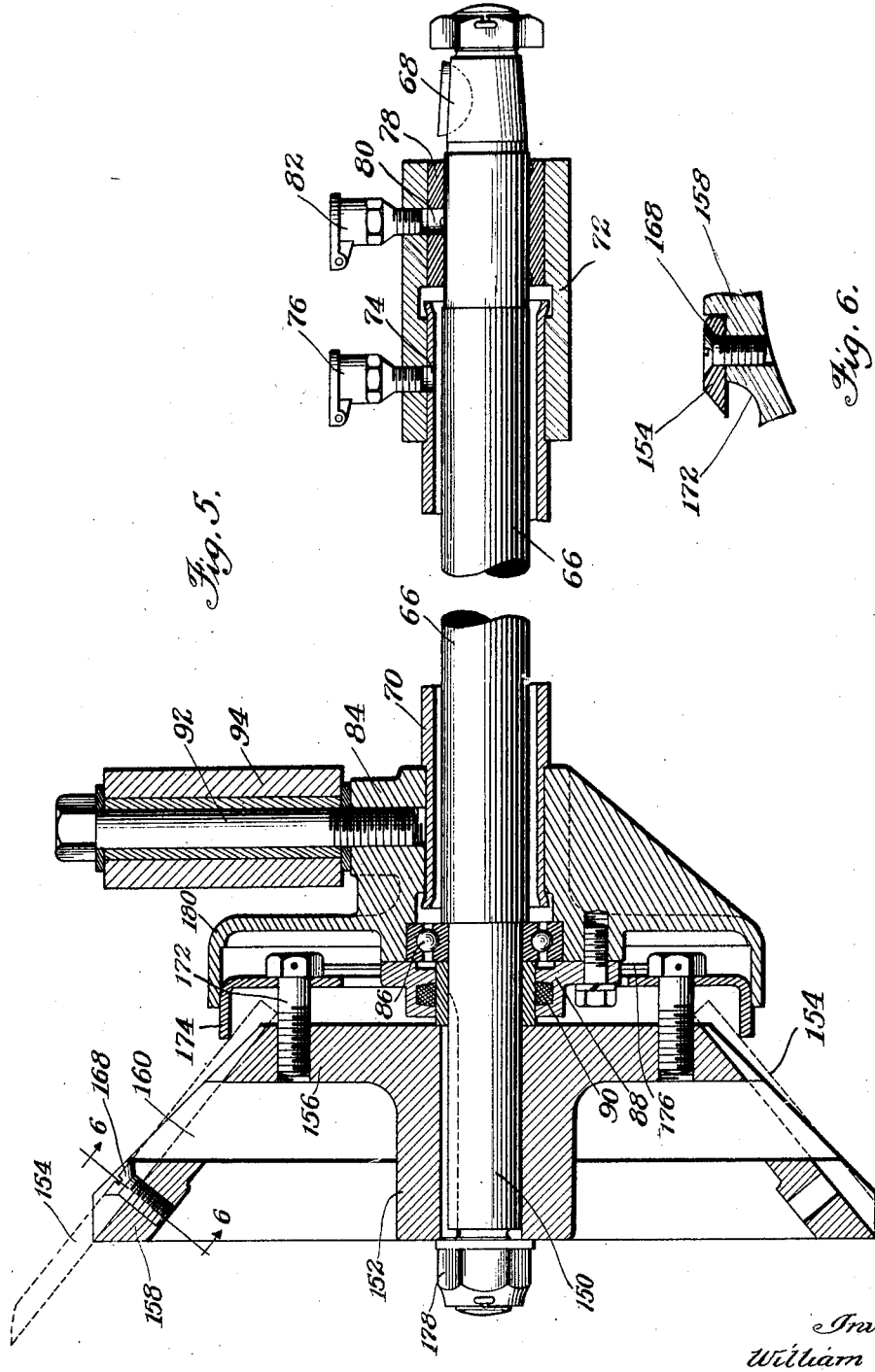

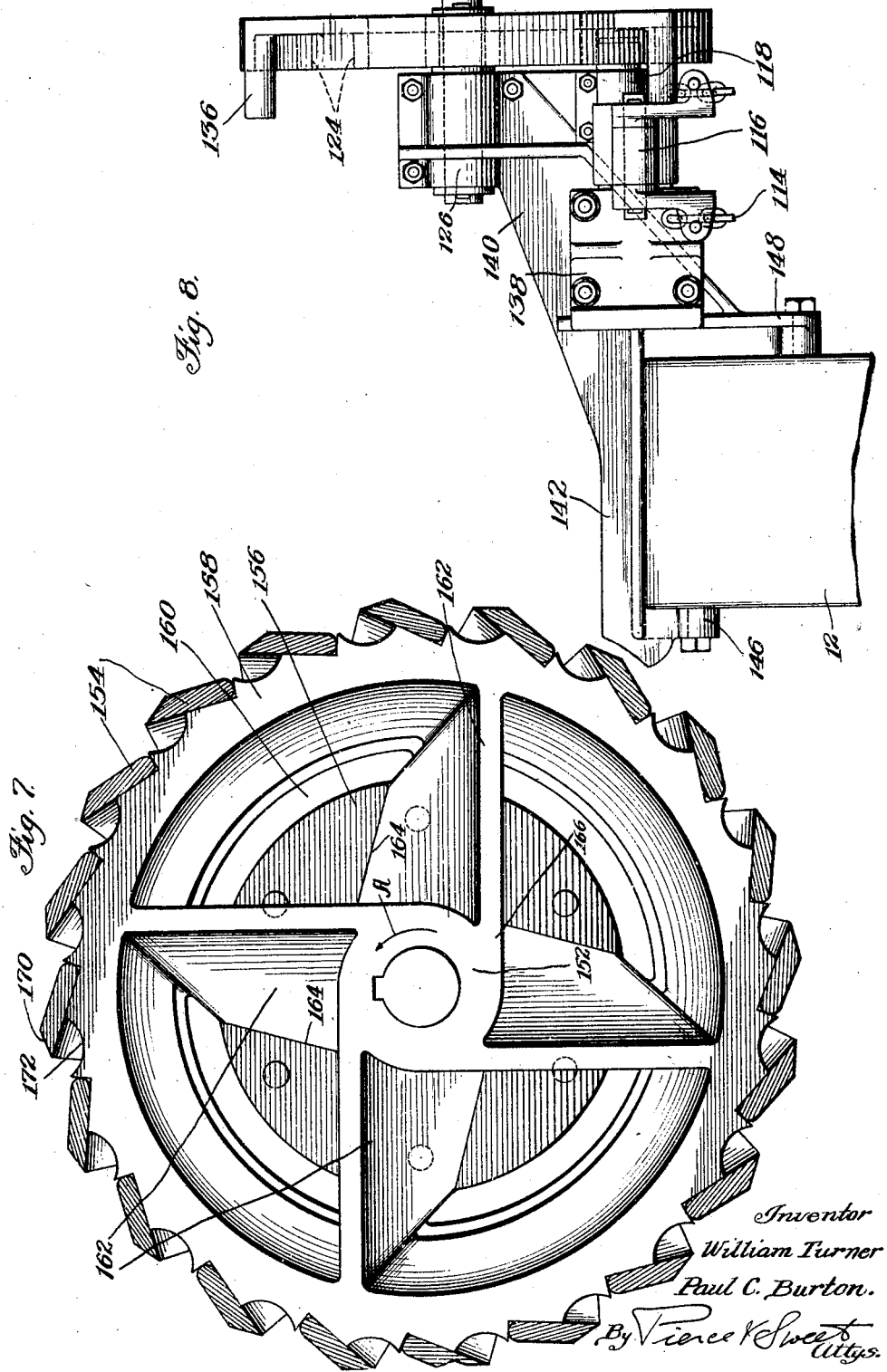

1,699,552

UNITED STATES PATENT OFFICE.

WILLIAM TURNER, OF CHICAGO, AND PAUL C. BURTON, OF HINSDALE, ILLINOIS, ASSIGNORS, BY DIRECT AND MESNE ASSIGNMENTS, TO TURNER ROTARY PLOWS, OF CHICAGO, ILLINOIS, A COMMON-LAW TRUST.

EARTH WORKING.

Application filed February 26, 1925. Serial No. 11,747.

Our invention relates to earth working implements, and more specifically to an improved rotary plow embodying the self-clearing features outlined in the co-pending application of William Turner, Serial No. 685,518, filed Jan. 11, 1924.

Among the objects and advantages of the invention may be enumerated:

First, greater freedom of movement for the earth working element, particularly in an up and down direction.

Second, improved means for taking the side thrust on the element without interfering with such vertical movement.

Third, a strong, light working element, rigid in service, but readily taken apart for changing blades or replacement of broken blades.

Fourth, an improved arrangement for reducing bending stress on the propeller shaft, and lubricating the movable outboard bearing thereof.

Fifth, better ground clearance.

Sixth, an improved unitary drive and clutch means.

Seventh, a more accurate height adjustment, easier to operate, and self-locking.

Further objects and advantages of the invention will become apparent as this description proceeds.

In the accompanying drawings:

Fig. 1 is a partial plan view and Fig. 2 a partial side elevation of a tractor equipped with plowing means according to the invention.

Fig. 3 is a rear end elevation of the clutch and transmission, partly broken away.

Fig. 4 is a section through the clutch and transmission casing.

Fig. 5 is an enlarged detail section of the earth working element and propeller shaft.

Fig. 6 is a detailed section on line 6—6 of Fig. 5.

Fig. 7 is a rear end elevation of the drum for the earth working element with the blades in section.

Fig. 8 is a rear elevation of the height adjustment means.

Tractor.

In the embodiment of the invention selected for illustration, the tractor comprises the usual body 10, rear axle housing 12 and drive wheels 14. The driver's seat 16 is supported by the usual leaf spring 18 bolted to the body at 20.

Transmission.

Referring now to Figs. 3 and 4, we have illustrated a casing bolted to the body 10 at 22, and carrying a shaft 24 driven at a constant speed ratio from the engine by any suitable means such as bevels 26 and 28. (See Fig. 1.)

Shaft 24 drives bevel gear 30 by means of bevel pinion 32. The hub of gear 30 carries clutch teeth adapted to mesh with cooperating teeth on the splined clutch 34 by means of which the power connection to shaft 36 may be controlled by the operator. We have illustrated a vertical shaft 38 carrying foot lever 40 at its upper end and its lower end an eccentric toe 42 riding in groove 44 in the clutch. To assure full stroke operation of the clutch, we prefer to provide a spring-pressed ball 46 engaging suitable pockets in the shaft and tending to hold the clutch either completely engaged or completely disengaged.

Shaft 36 carries pinion 48 meshing continuously with both gears 50 and 52 on stub shafts 54 and 56.

The clearance of stub shafts 54 and 56 above the ground is determined by the length and inclination of propeller shafts 58 and 60. It should be noted that no portion of the transmission is any lower than these shafts and their driving gears, pinion 48 riding between and above the same.

Torque and thrust connections.

Stub shafts 54 and 56 carry the driving yokes 62 of universal joints supported as well as driven by said shafts, each joint including the yoke 64 keyed on the live propeller shaft 66 at 68 (see Fig. 5). Each propeller shaft comprises the live shaft 66 and a stationary, i. e. non-rotating, sleeve 70 completely housing the same. At its forward end the sleeve carries terminal 72 comprising a rear portion receiving the sleeve and drilled at 74 for an oil cup 76 and a front portion holding an anti-friction lining 78 bearing on the live shaft and also drilled at 80 to receive another oil cup 82.

As its rear or free end sleeve 70 enters a stationary head 84 provided with suitable supporting means for the fixed race 86 of a ball bearing for the end of the live shaft. A closure member 88 bolted on said head is provided with a lubricant-retaining packing 90. It will be apparent that oil cup 82 will keep bearing 78 suitably lubricated and that oil injected by means of cup 76 will run down the annular space between the sleeve and shaft and keep the rear ball bearing suitably bathed in lubricant.

A vertical bolt 92 threaded into head 84 is pivoted in a split bearing 94 integral or rigid with a horizontal split bearing 96 spaced above the same as clearly shown in Fig. 2. Both bearings and the web connecting them can advantageously be formed from two simple metal stampings.

The horizontal bearing 96 is fixedly clamped on the free end of a thrust tube. We have illustrated two working elements spaced laterally and fore and aft to plow a double furrow, and held with respect to fore and aft displacement by propeller shafts 58 and 60, and with respect to lateral displacement by thrust tubes 98 and 100.

A rigid bracket 102 is firmly clamped to the body of the tractor as by means of bolts 104 engaging the tail-piece usually provided for hitching two various farm implements, and extends laterally to terminate at 106 far enough from the earth working elements to let tubes 98 and 100 accommodate the necessary vertical movement of the elements without too much angular displacement. An abutment flange 108 supports sockets 110 receiving ball terminals 112 forming a universal joint for each thrust tube, or strut.

*Height support and adjustment.*

The earth working elements have to rise and clear themselves whenever a stone or other non-yielding obstacle is encountered by the blades. For this purpose the blades are rearwardly sloped so that the necessary vertical force will be generated at the point of contact to elevate the tool and avoid breaking the blade. We have found that, probably due to forward travel of the plow, when no such obstacle is encountered, the net lifting force developed between the blades and the earth is much smaller than might be anticipated. We believe this to be due to the fact that the blades rising out of the earth are still cutting into more or less undisturbed soil because of the forward travel. In any event, very little downward force is necessary to make the element work into the ground, and this force can be advantageously provided by the weight of the element itself. Referring especially to Fig. 2, flexible tension members in the form of chains 114 limit the downward displacement of the elements to that shown in the drawings, but obviously permit them to bob up loosely whenever that is necessary on account of an obstruction.

The upper ends of the chains 114 are suitably attached to the rear end of an arm 116 pivoted on a fixed pivot at 118 and integral with a forwardly projecting arm 120 constituting, in effect, a walking beam. The front end of arm 120 carries a roller 122 lying between walls 124 of a frame pivoted on a fixed pivot at 126. Walls 124 define a continuous spiral groove with its outer end at 128 and its inner end at 130 (see Fig. 2). They are united into an integral frame by short radial spokes 132 and long radial spokes 134 extending in to the hub and also out beyond the spiral to terminate in handle portions 136 extending axially in toward the driver's seat.

Both fixed shafts 126 and 118 may advantageously be clamped by cover plates 138 on a single bracket comprising an arm 140 and an integral yoke 142 spanning the central casing 144 of the rear axial housing and suitably bolted thereto at 146 and 148.

The inclination of the spiral groove is such that force tending to rotate the walking beam around the fixed pivot 118 will not overcome the friction of the parts to cause any movement of the frame. If it were necessary, a little extra friction could be provided for on fixed pivot 126, but we find with the ordinary simple cylindrical bearing shown there is adequate friction to lock the parts. On account of the small inclination of the groove, the amount of force required to turn the frame is correspondingly small and adjustment or withdrawal of the working element is very easy.

*The working element.*

Live shaft 66 terminates in a splined end 150 inside hub 152 of the drum supporting blades 154. The base 156 extends outwardly from one end of hub 152 and a ring 158 encircles the other end. Between the two there is clearance at 160, ring 158 being supported by four webs 162 integrally united along one radial edge at 164 with disc 156 and diverging tangentially at 166 from hub 152. The torque received by the hub 152 is in the direction of the arrow A of Fig. 7. It will be noted that webs 162 are rearwardly inclined to approximate spiral connection between ring 158 and disc 156 approximately in the same general direction as the tension stresses to be transmitted from disc 156 to ring 158 by the load. It will also be noted that ring 158 is spaced from hub 152 and that the element can be lowered until a considerable portion of the ring is below the ground level, the dirt passing through the blades and between the ring and hub quite freely, unhindered by the webs 162.

The conical surface of the drum is cut away to form spiral grooves receiving the individual blades 154. In ring 158 these grooves are not less deep than the thickness of blade 154 and a bolt 168 holds the blade firmly seated.

It will be apparent upon reference to Figs. 6 and 7 that these grooves have their bottoms at an angle to the circumference of the drum, this being the angle at which we prefer to set the blade to secure the most efficient cutting action for the blade edges at 170. Intermediate the grooves the face of ring 158 is preferably cut away to define a pocket 172 of such shape that dirt sliding across the face of one blade will not enter a wedge shaped cavity sufficiently acute to hold the dirt entering the same.

The grooves in disc 156 are materially less deep than the thickness of the blade, and the butts of the blades are all clamped firmly in place in a single operation by tightening bolts 172 to force retaining cup 174 into engagement therewith. A retaining wire 176 may be passed through the heads of all six bolts 172 to prevent their working loose in service. The element as a whole is held in place on shaft 150 by a suitable retaining nut 178. In case a blade is broken or needs to be replaced, the removal of nut 178 will let the entire working element fall freely off, providing access to bolts 172 for removing cap 174. Head 84 carries an annular cup 180, preferably formed integral therewith, and telescoping outside cap 174 to form a seal preventing entry of dirt.

Without further elaboration, the foregoing will so fully explain the gist of our invention, that others may by applying current knowledge, readily adapt the same for use under various conditions of service, without eliminating certain features which may properly be said to constitute the essential items of novelty involved, which items are intended to be defined and secured to us by the following claims.

We claim:

1. A plow comprising rotary elements developing side thrust, a rigid brace offset laterally from said elements, struts converging from said elements upon said brace, each strut having a universal joint connection at one end to permit its element to move up and down freely, a rotary drive shaft extending forward from each element, a universal joint drive at the front end of each shaft for turning the same, a sleeve housing said shaft and extending forwardly close to the adjacent yoke of the universal joint, a pivot rigid with said sleeve, a journal for said pivot rigid with said strut, said sleeve being spaced from said shaft throughout its length, bearings for said shaft at the ends of said sleeve, the rear bearing being a ball bearing, a lubricant retaining packing beyond said ball bearing, means for injecting lubricant between sleeve and shaft near the front bearing, and means for actuating said elements.

2. A plow comprising a rotary element developing side thrust, a rigid brace offset laterally from said element, a strut extending from said element to said brace, said strut having a universal joint connection with the brace, a rotary drive shaft extending forward from each element, a universal joint drive at the front end of each shaft for turning the same, a sleeve housing said shaft and extending forwardly close to the adjacent yoke of the universal joint, a pivot rigid with said sleeve and lying substantially perpendicular to both said sleeve and said strut, a journal for said pivot rigid with said strut, and means for actuating said element.

3. A plow comprising a rotary element developing side thrust, a rigid brace offset laterally from said element, a strut extending from said element to said brace, said strut having a universal joint connection at one end and an articulated connection at the other to permit the element to move up and down freely, and means for actuating said element.

4. A plow comprising a rotary element developing side thrust, a rigid brace offset laterally from said element, a strut extending from said element to said brace, a rotary drive shaft extending forward from said element, articulated joints at both ends of said strut, a universal joint drive at the front end of said shaft, and means for actuating said element.

5. A plow comprising rotary elements developing side thrust, a rigid brace offset laterally from said elements, struts converging from said elements upon said brace, a rotary drive shaft extending forward from each element, a universal joint drive at the front end of each shaft for turning the same, articulated joints at both ends of each strut, whereby the torque and axial thrust are all carried by said drive shafts, and the side thrust by said struts, and each element is free to rise and fall, and means for actuating said elements.

6. A plow comprising a rotary element, a rotary drive shaft extending forward from said element, a universal joint drive at the front end of said shaft for turning the same, a sleeve housing said shaft, said sleeve being spaced from said shaft throughout its length, bearings for said shaft at the ends of said sleeve, the rear bearing being a ball bearing, a lubricant retaining packing beyond said ball bearing, means for injecting lubricant between sleeve and shaft near the front bearing, and means for actuating said element.

7. A plow comprising a rotary element having spiral blades developing side thrust, a rotary drive shaft extending forward from said element for rotating said element and for traversing it in the general direction of its axis of rotation, a universal joint drive at the front end of said shaft for turning the same, a sleeve housing said shaft, a laterally extending strut connected to the rear end of said sleeve to take the side thrust, and means for actuating said element.

8. A plow comprising a rotary element developing side thrust, a rotary drive shaft extending forward from each element, a universal joint drive at the front end of each shaft for turning the same, a sleeve housing said shaft, said sleeve being spaced from said shaft throughout its length, bearings for said shaft at the ends of said sleeve, means for injecting lubricant between sleeve and shaft near the front bearing, a laterally extending strut connected to the rear end of said sleeve to take the side thrust, and means for actuating said elements.

9. A plow comprising a rotary element having spiral blades developing side thrust, a rotary drive shaft extending forward from each element for rotating said element and for traversing it in the general direction of its axis of rotation, a universal joint drive at the front end of each shaft for turning the same, a laterally extending strut near the rear end of said shaft to take the side thrust, and means for actuating said element.

10. A plow comprising a plurality of rotary earth working elements, propeller shafts extending forwardly and upwardly therefrom, universal joint driving means at the front end of each propeller shaft, fixed shafts driving said propeller shafts through said joints, gears on said fixed shaft, a common drive gear located above said gears and meshing with all of them, a transmission shaft carrying said drive gear, a bevel gear rotatable on said transmission shaft, a source of power for driving said bevel gear, an operator-controlled clutch for connecting said bevel gear and said transmission shaft, and means for actuating said elements.

11. A plow comprising a plurality of rotary earth working elements, propeller shafts extending forwardly and upwardly therefrom, universal joint driving means at the front end of each propeller shaft, fixed shafts driving said propeller shafts through said joints, gears on said fixed shafts, a common drive gear located above said gears and meshing with all of them, a casing enclosing said fixed shafts and their gears, transmission means for turning said drive gear, a casing for said transmission clearing the ground by a distance not less than the ground clearance of said fixed shaft casing, and means for actuating said elements.

12. A plow comprising a tractor having a rear axle and a power take-off in front of said rear axle, a plurality of rotary drive shafts driven by said take-off and extending rearwardly and downwardly below said rear axle, universal joints in said shafts at their front ends, rotary elements at the rear ends of said shafts, and lateral struts connected to the rear ends of said shafts and to said tractor to take the side thrust of said elements.

13. A plow comprising a tractor having a rear axle and a power take-off in front of said rear axle, a plurality of rotary drive shafts driven by said take-off and extending rearwardly and downwardly below said rear axle, universal joints in said shafts at their front ends, rotary elements at the rear ends of said shafts, and lateral struts connected to the rear ends of said shafts and to said tractor to take the side thrust of said elements, one of said shafts being shorter than another, the strut for the short shaft crossing over the other shaft and being spaced above the same to leave clearance for the independent rise and fall of said shafts.

14. A plow comprising a tractor having a rear axle and a power take-off in front of said rear axle, a rotary drive shaft driven by said take-off and extending rearwardly and downwardly below said rear axle, a universal joint in said shaft at the front end, and a lateral strut connected to the rear end of said shaft and to said tractor to take the side thrust of an earth-working element on said shaft.

In witness whereof, we hereunto subscribe our names this 5th day of February, 1925.

WILLIAM TURNER.
PAUL C. BURTON.